(No Model.) 4 Sheets—Sheet 1.

T. OLSEN.
TORSIONAL TESTING MACHINE.

No. 539,367. Patented May 14, 1895.

WITNESSES:
A. W. Budd
Lacey L. Cadwallader

INVENTOR
Tinius Olsen
by Henry D. Wiegand
att'y (No Model.) 4 Sheets—Sheet 2.

T. OLSEN.
TORSIONAL TESTING MACHINE.

No. 539,367. Patented May 14, 1895.

WITNESSES:

INVENTOR (No Model.) 4 Sheets—Sheet 3.
T. OLSEN.
TORSIONAL TESTING MACHINE.
No. 539,367. Patented May 14, 1895.
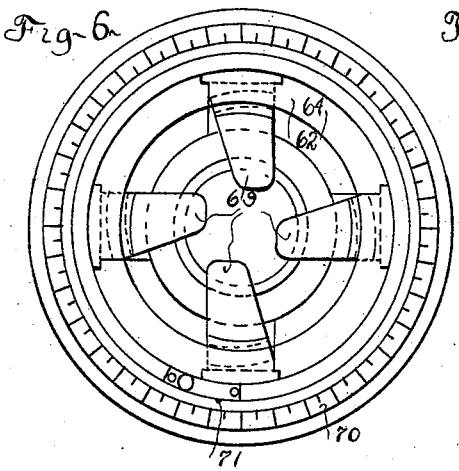
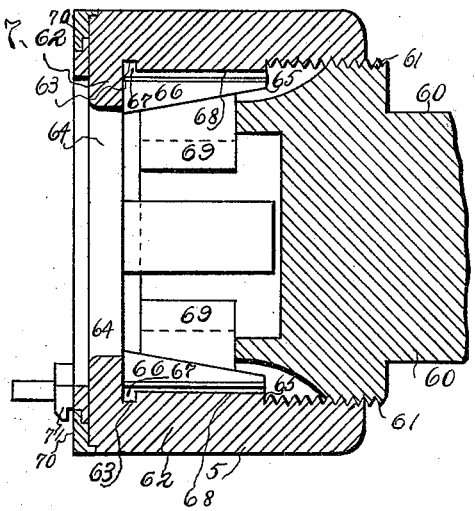
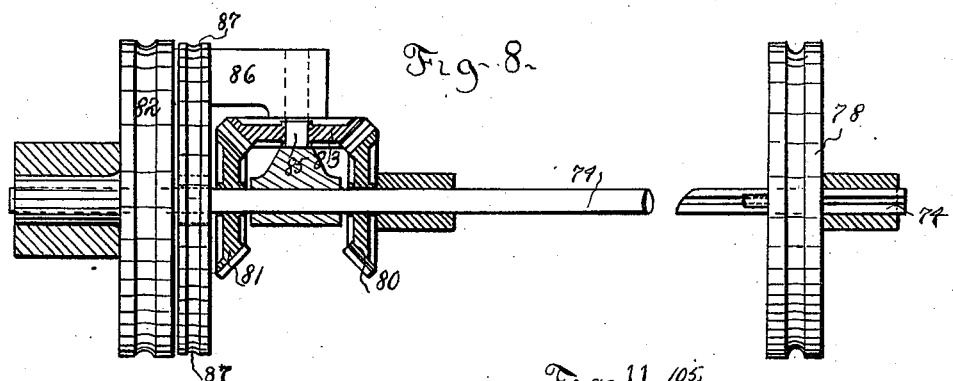
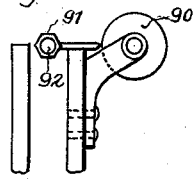
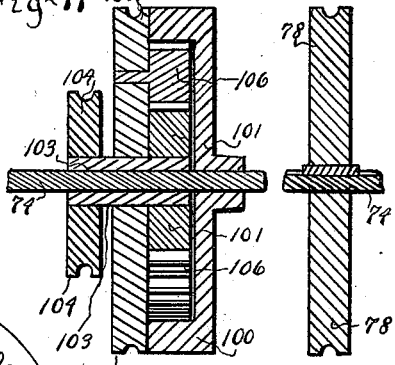
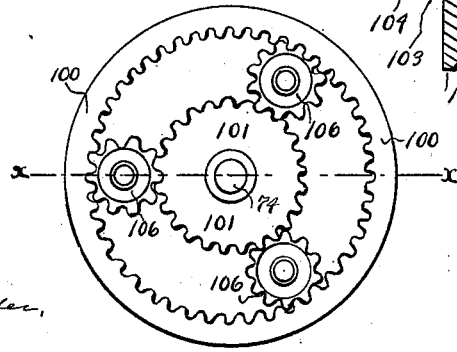
WITNESSES:
INVENTOR
Tinius Olsen (No Model.) 4 Sheets—Sheet 4.
T. OLSEN.
TORSIONAL TESTING MACHINE.
No. 539,367. Patented May 14, 1895.
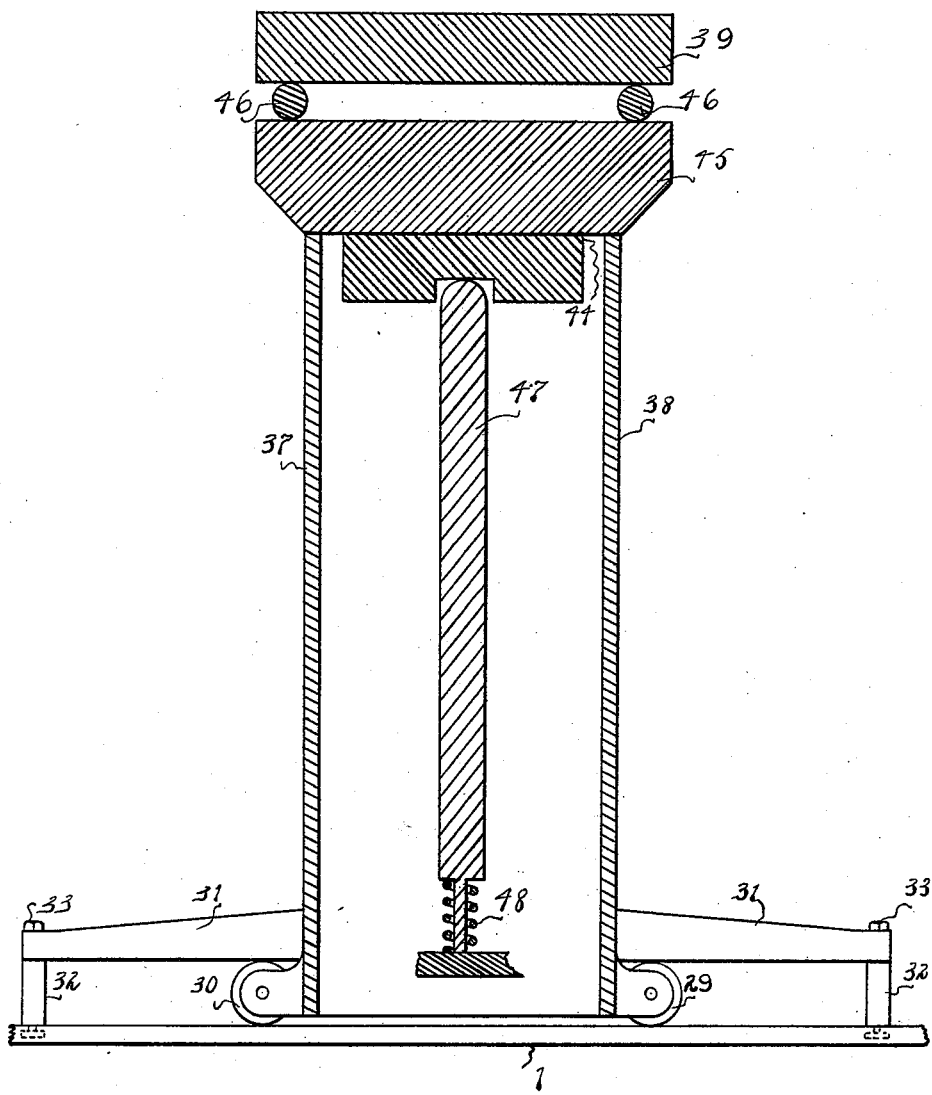
WITNESSES: INVENTOR

UNITED STATES PATENT OFFICE.

TINIUS OLSEN, OF PHILADELPHIA, PENNSYLVANIA.

TORSIONAL TESTING-MACHINE.

SPECIFICATION forming part of Letters Patent No. 539,367, dated May 14, 1895.

Application filed May 22, 1894. Serial No. 512,112. (No model.)

*To all whom it may concern:*

Be it known that I, TINIUS OLSEN, a citizen of the United States, residing at Philadelphia, in the county of Philadelphia and State of Pennsylvania, have invented certain new and useful Improvements in Torsional Testing-Machines; and I do hereby declare the following to be a sufficiently full, clear, and exact description thereof as to enable others skilled in the art to make and use the said invention.

This invention relates to machines for testing the strength, ductility and elasticity of materials, and especially to the testing of the properties of materials under torsional strains, and has for its object the facility of application of specimens to the machine, the elimination of friction, and other causes of inaccuracy, and the better and more accurate automatic recording of the several properties of the specimen under test.

To this end this invention consists of an improved torsional gripping device, and mechanism for applying torsional stress rapidly or slowly and for quickly releasing the gripping devices; mechanism for weighing and delineating upon a diagram the stresses, and extent of torsion, and limits of elasticity, and ductility of the specimen and devices for avoiding or eliminating from recording operations stresses resulting from changes in length of the specimen which otherwise would impair the accuracy of the diagram.

The construction and operation of this machine is hereinafter particularly described and shown in the accompanying drawings, in which—

Figure 1:
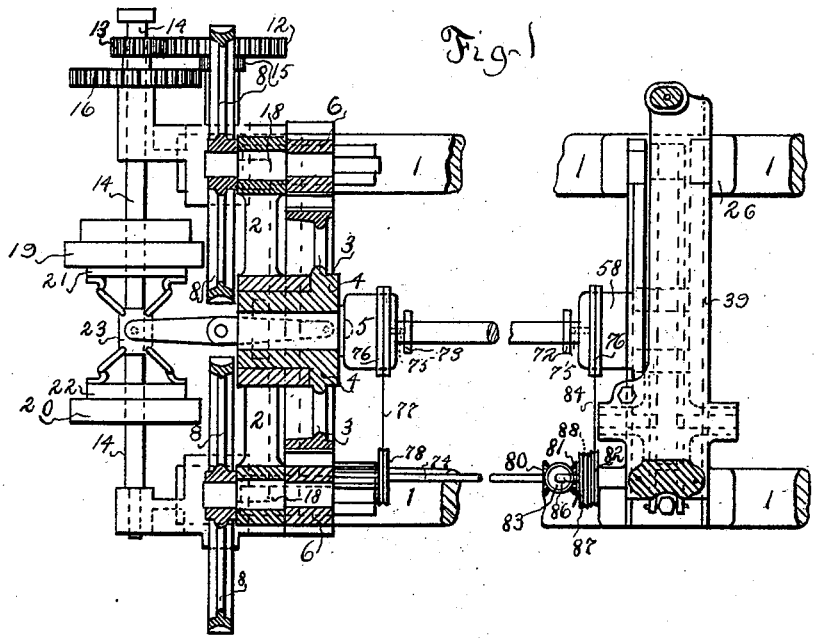
Figure 3:
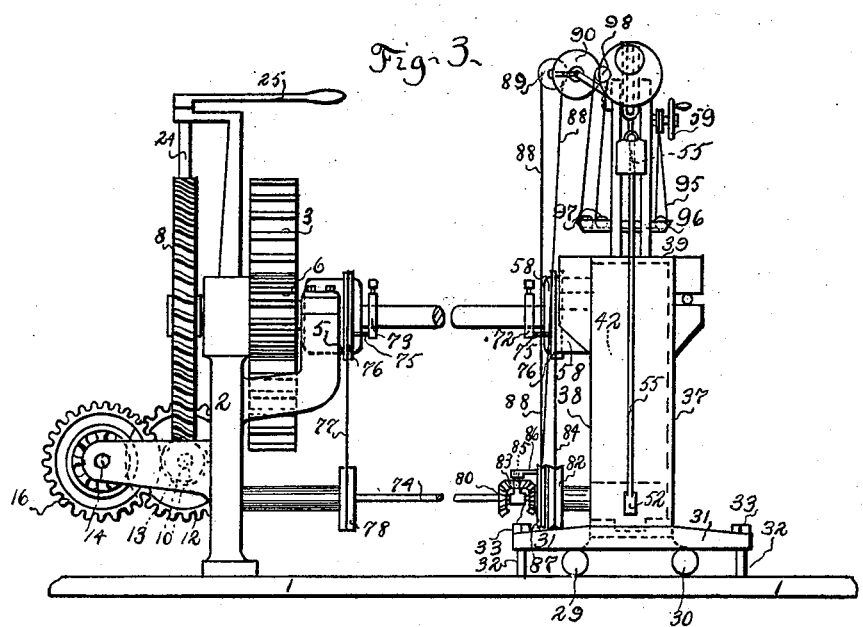
Figure 2:
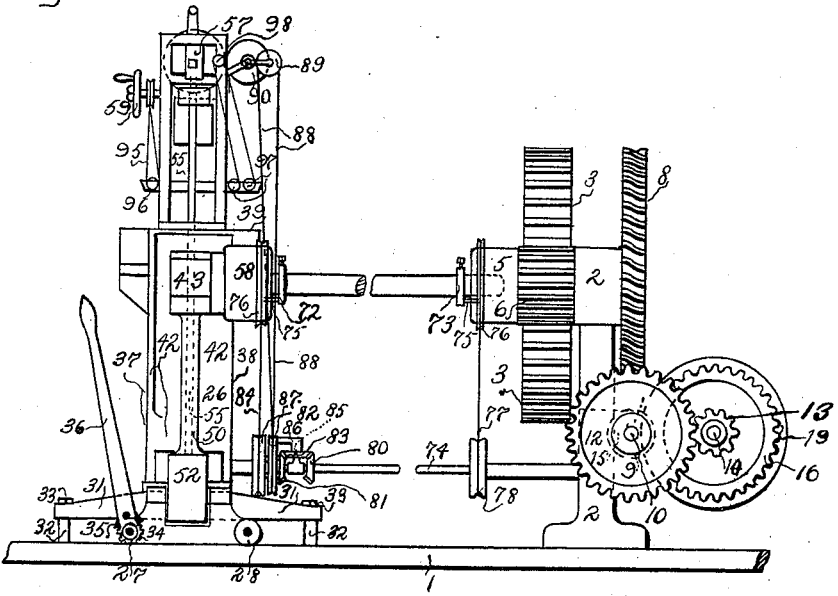
Figure 4:
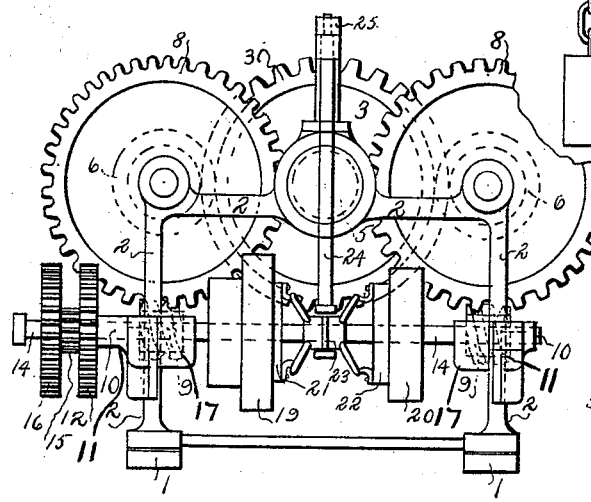
Figure 5:
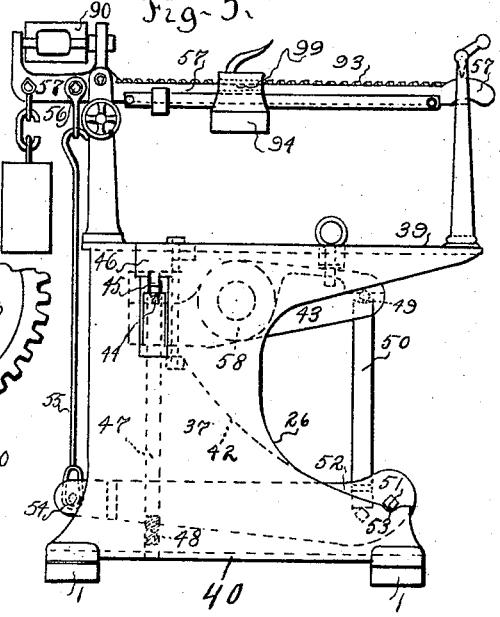

Figure 1 shows a partial top view or plan of the machine in partial section; Fig. 2, a front elevation; Fig. 3, a rear elevation; Fig. 4, a right end elevation; Fig. 5, a left end elevation. Figs. 6 and 7 respectively show an enlarged front and sectional view of the gripping-jaws and the graduated dial-plate. Fig. 8 shows a detached partially-sectional enlarged view of part of the mechanism for transmitting angular motion between definite points in the length of the specimen from the specimen to the diagram-surface. Fig. 9 shows an enlarged view of the mechanism for moving the pencil for recording stresses upon the diagram-surface. Figs. 10 and 11 show, respectively, in side view and section, an equivalent substitute or modification of the mechanism transmitting motion from the specimen to the recording-cylinder. Fig. 12 is a partial section showing the support for the inverted fulcrum of the weighing-beam.

Referring to the drawings, 1 represents the bed-plate; 2, the frame of the power applying mechanism; 3, the principal gear wheel having a hollow arbor 4, attached to the rotating gripping chuck 5.

6, 6, are two pinions having journals supporting and turning in bearings 18, on the frame 2; and engaging in the teeth of the wheel 3, which they both support and turn.

8, 8, are worm wheels, attached to and turning the pinions 6, 6. The worm wheels 8, 8, are turned by endless screws 9, 9, on the arbor 10; turning in bearings 11, 11, in the frame 2. The endless screws 9, 9, are each inclosed in a lubricating trough, or case 17.

The arbor 10, is rotated by means of a toothed wheel 12, engaging in the pinion 13, on the driving arbor 14, when heavy stresses are to be applied with slow motion, and when lighter stresses and quick motion are desired by the toothed wheel 15 turned by the wheel 16 on the arbor 14, the wheels 15 and 16 being arranged to gear with each other alternately with the wheels 12 and pinion 13, by sliding the pinion 13 and wheel 16 on the arbor 14.

The arbor 14 is turned in either direction by hand or belt pulleys 19 and 20 engaged and disengaged therewith by means of friction clutches 21 and 22 connected with and operated by the sleeve 23, rock shaft 24 and hand lever 25. 26 represents the frame of the stress weighing head. This is supported on rollers 27, 28, 29 and 30 resting on and guided lengthwise upon the bed-plate 1. The rear rollers 29 and 30 which during the application of stresses are pressed upwardly, are held down and roll under a bar 31, clamped in parallel position to the bed-plate 1 by the bolts 32 and nuts 33. In one of the forward rollers 27 a ratchet 34 is formed, in which a pawl 35 on a hand lever 36 engages, by means of which the weighing head 26 may be moved lengthwise on the bed-plate 1. The frame 26 of the weighing head is preferably formed as a hollow shell with parallel side walls 37 and 38 united by the top plate 39, bottom plate 40, and oblique web 42, the front being left open for access to the levers and connected parts.

In the upper portions of the frame 26, a lever 43 is placed having a knife edged bearing 44 at one end pressed against a fulcrum 45, held against rollers 46, bearing against the under side of the top plate 39. This end of the lever 43 is pressed upwardly by a bar 47, and spring 48, so as to retain its position and hold the parts in contact when relieved of stress. The other end of the lever 43 is provided with knife edges 49, which bear upon the upper end of the rod 50, which transmits the stress downwardly by knife edged bearings 51, on the lever 52, having supporting knife edges 53, near one end resting upon a fulcrum in the frame 26. The rod 50, is provided with convex cylindric ends on which it is free to rock, and the fulcrum 45 to roll so that any lengthwise motion of the clamps, resulting from changes in length of the specimen under test, can take place freely without affecting the stress of torsion which alone is weighed, indicated and recorded. The opposite end of the lever 52 is provided with knife edge bearings 54, connected by links 55, to the knife edges 56, of the graduated weighing beam 57, above the upper part of the frame 26.

On the lever 43 in axial line with the gripping clamp 5 is placed a like gripping clamp 58, by which the specimen to be twisted and tested is held.

The weighing beam 57, and mechanism for progressively and automatically moving the pea or weight 94, and for moving the dial for indicating and the recording diagram surface and pencil are similar to those described in my United States Letters Patent No. 399,549, dated March 12, 1889, and No. 445,476, dated January 27, 1891, or the weight 94, may be moved progressively by the operator by the hand wheel 59, and cord 95, guided by pulleys 96 and 97, in the vertical plane of the knife edges 56 to a wheel 98 in the screw 93, engagement of a nut 99 in the pea or weight 94.

The construction of the clamps 5, and 58, is shown in Figs. 6 and 7. These are of similar construction and differ only in the clamp 5, being attached to the gear wheel 3, and the clamp 58, to the weighing lever 43, so that a description of one suffices for both. A shaft 60, is screw-threaded at 61, and fitted with a cap nut 62, having an internal circumferential groove 63, in it and a front central aperture 64, through which the ends of the specimens to be tested are inserted. In the front end of the shaft 60 are formed several parallel sided radial slots 65, in each of which slides a block or key 66, being held in position lengthwise by a projecting rim 67, fitting in the groove 63. The outer face of each key 66, rests against the cylindric internal face 68, of the cap nut 62, and the inner faces of the keys 66, are inclined in the direction of their length, but are approximately concentric with the shaft 60, and nut 62. Against the inner surfaces of the keys 66, convex surfaces of the jaws 69 rest, and rock or roll. The inner ends of the jaws 69, are made of involute form, and are presented tangentially to the surface of the specimen to be gripped so that as the shaft and clamp rotate the clamps are tightened against the specimen by the rocking of the jaws 69 on the keys 66. Lengthwise motion of the keys 66, imparted to them by the nut 62, adjusts the jaws 69 radially to suit specimens differing in diameter.

A graduated dial 70, on each cap nut, and an indicator 71, connected with the specimen by carriers 72 and 73 serve to show the angle or degree of torsion between the points of the attachment of the carriers.

The angular motion or degree of torsion between two definite points on the specimen is transmitted by carriers 72 and 73 clamped at such points upon the specimens, and connected by a finger 75 upon each carrier to a rim or wheel 76, turning on each clamp 5 and 58, concentrically with the dial 70, and each wheel 76 actuates an index 71, showing the extent of torsion on the dial. A cord 77 extends from the wheel 76 on clamp 5 of the driving or power head to a wheel 78, on a splined shaft 74, which is fitted to slide through the wheel 78, and has a feather or sliding key which engages in the spline of the shaft 74 that compels the shaft 74 and wheel 78 to turn together. The shaft 74 is parallel with the axis of the clamps 5 and 58, and is supported by bearings formed in the frames 2 and 26.

A beveled toothed wheel 80 is secured upon the shaft 74 so as to turn with it. A second beveled toothed wheel 81 is fitted upon the shaft 74 so as to turn freely upon it, and has attached to it a wheel 87 which receives motion from the wheel 76, on the clamp 5, through a cord 84. A third beveled toothed wheel 83, engages in the teeth of the wheels 80 and 82 so as to be turned thereby. The wheel 83, turns freely in an arbor 85, at right angles to the shaft 74, having a bearing 86 fitting on the shaft 74, so that the arbor 85 and bearing 88, have an angular motion equal to the difference of the motion of the wheels 80 and 82.

A pulley 87 concentric with the shaft 74, is attached to the arbor 86, turns with it, and has connected therewith a cord 88 leading to a wheel 89, on the recording or diagram bearing cylinder 90, so as to turn to it in exact proportion to the angular motion between the carriers 72 and 73.

It should be observed that the direction of the cords 84 and 88, is such that the motion of one is reversed and therefore if the carriers 72 and 73 should both turn equally in the same direction there would be no angular motion of one relative to the other, and the wheels 80 and 82 would then equally in opposite directions turn the intermediate wheel 83, on the arbor 85, but not angularly move the arbor 83 on the shaft 74 or the connected wheel 87, cord 88, wheel 89, and cylinder 90. As soon as any change in the angle of the carriers 72 and 73 to each other occurs it is attended with a proportional movement in the cylinder 90 and intermediate connecting parts.

The recording cylinder when attached to the weighing beam 57, is made perfectly balanced and the cord 88 must pass to the wheel 89, in the vertical plane of the knife edges 56 of the weighing beam 57. The recording pencil is operated by a nut 91, moved by a screw thread 92 on the same screw 93 which moves the poise weight or pea 94.

Instead of the beveled toothed wheels 80, 81, an arbor 85 turning the wheel 87, to transmit differences of motion between the carriers 72 and 73 to the recording cylinder 90, any other arrangement in which the motion of a pivotal center is controlled by the oppositely moving wheels or levers may be substituted. An equivalent substitute is shown in Figs. 9 and 10. In this construction an internally toothed wheel 100 is fixed on the shaft 74 so as to turn with it, a spur wheel 101 is fitted to turn, with a sleeve 103, freely in the shaft 74, and a pulley 104 is attached to the sleeve 103, another pulley 105 turns freely on the sleeve 102, and to the side of the pulley 105 are pivotally attached one or more toothed wheels 106, which engage in the spur wheel 101, and the internally toothed wheel 100. The pulley 104 should bear the same diametral proportion to the pulley 78 on the shaft 74, that the number of teeth in the spur wheel 101 bears to the number of teeth in the internally toothed wheel 100. The wheels 76, on the clamps 5 and 58, being assumed to be of equal diameter, and the cords leading therefrom in the same direction as those shown in the preceding figures.

Having described my invention, what I claim is—

1. In a machine for testing materials under torsional stress a rotating clamp and mechanisms for supporting and turning the same; a bed-plate connecting the rotating clamp with a stress-weighing mechanism in combination with a clamp attached to a weighing lever an inverted fulcrum therefor; and an elastic support arranged to hold said weighing lever in contact with said fulcrum substantially as set forth.

2. In a machine for testing materials under torsional stress, a weighing lever, a clamp attached thereto and provided with an inverted fulcrum in combination with a rolling guide to said fulcrum, arranged to permit motion in the direction of the axis of said fulcrum, substantially as set forth.

3. In a machine for testing materials under torsional stress, a gripping clamp having a slotted shaft provided with an external screw thread, a cap fitted therein having an internal circumferential groove, keys fitted to slide in the slotted shaft and engaging in said circumferential groove, in combination with involute surfaced rocking jaws arranged to bear on said keys, and when rotated compress specimens placed between them substantially as set forth.

4. In a machine for testing and indicating the properties of materials under torsional stress, gripping clamps adapted to hold specimens and apply torsional stress thereto a graduated circle concentric with the axis of said clamps, an index arranged to turn proximately to said circle in combination with carriers adapted to be attached to the specimens at points intermediate between the gripping clamps, and mechanism connecting one of said carriers with the graduated circle to turn the same, and mechanism connecting the other carrier with the index, to turn said index, and thereby indicate the angle of torsion of the specimen between the points of application of the carriers substantially as set forth.

5. In a machine for testing materials under torsional stress, a gripping device or clamp and a spur wheel attached concentrically thereto in combination with two pinions engaging at diametrically opposite points in the teeth of said spur wheel mechanism to rotate said pinions with equal velocities in the same direction and arranged to support said spur wheel substantially as set forth.

6. In a machine for torsionally testing material, and graphically recording such testing, a clamping mechanism, attached to a rotating gearing, a second clamping mechanism connected with a weighing mechanism, and a recording surface, a marking point actuated by the stress weighing mechanism, and two carriers adapted to be attached to the specimen upon test between the clamping mechanism in combination with a mechanism connected with the carriers and arranged to move the recording surface proportionally only to the relative angular motion of the carriers substantially as set forth.

TINIUS OLSEN.

Witnesses:
C. R. MORGAN,
LACEY L. CADWALLADER.